United States Patent [19]

Whitaker

[11] Patent Number: 4,740,912

[45] Date of Patent: Apr. 26, 1988

[54] QUINEWS-ELECTRONIC REPLACEMENT FOR THE NEWSPAPER

[76] Inventor: Ranald O. Whitaker, 4719 Squire Dr., Indianapolis, Ind. 46241

[21] Appl. No.: 935,923

[22] Filed: Nov. 28, 1986

Related U.S. Application Data

[63] Continuation-in-part of Ser. No. 404,325, Aug. 2, 1982, abandoned.

[51] Int. Cl.⁴ ............................................. G06F 9/00
[52] U.S. Cl. ............................................. 364/900
[58] Field of Search ............... 364/200, 900; 358/147, 358/114, 142, 122; 340/735, 723

[56] References Cited

U.S. PATENT DOCUMENTS

| | | | |
|---|---|---|---|
| 4,099,258 | 7/1978 | Parsons | 364/900 |
| 4,233,628 | 11/1980 | Ciciora | 358/147 |
| 4,290,062 | 9/1981 | Marti et al. | 340/735 |
| 4,303,941 | 12/1981 | Marti et al. | 358/147 |
| 4,308,558 | 12/1981 | Hernandez | 358/142 |
| 4,315,257 | 2/1982 | Hernandez | 340/723 |
| 4,323,921 | 4/1982 | Gillou | 358/114 |
| 4,337,483 | 6/1982 | Guillou | 358/114 |
| 4,354,201 | 10/1982 | Sechet et al. | 358/122 |
| 4,361,848 | 11/1982 | Polgner et al. | 358/1 |

Primary Examiner—Gareth D. Shaw
Assistant Examiner—John G. Mills, III

[57] ABSTRACT

A system for replacing the newspaper. A radio transmitter transmits the news as "pages" of code. The transmission is received in the home and the encoded pages stored in computer memory. The user selects pages from this memory for viewing on a monitor. That which is new is the storage of the entire news of a moment in mass memory in the home, permitting the user to select directly from this memory the material which he desires to read.

5 Claims, 10 Drawing Sheets

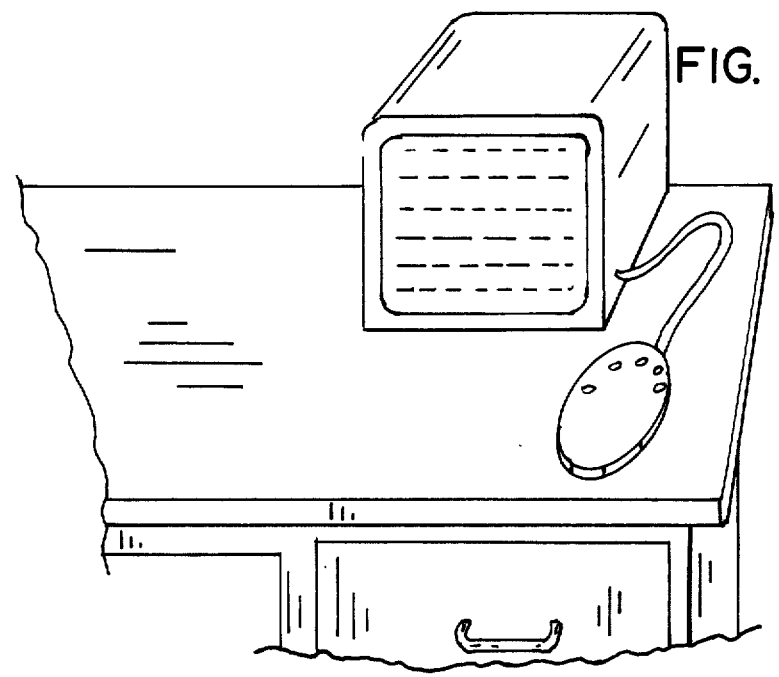
FIG. 1
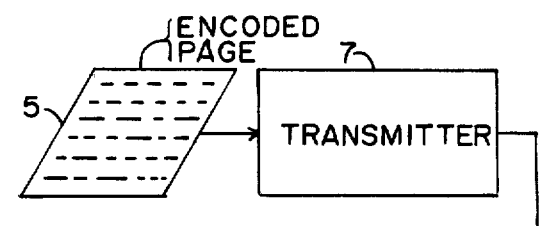
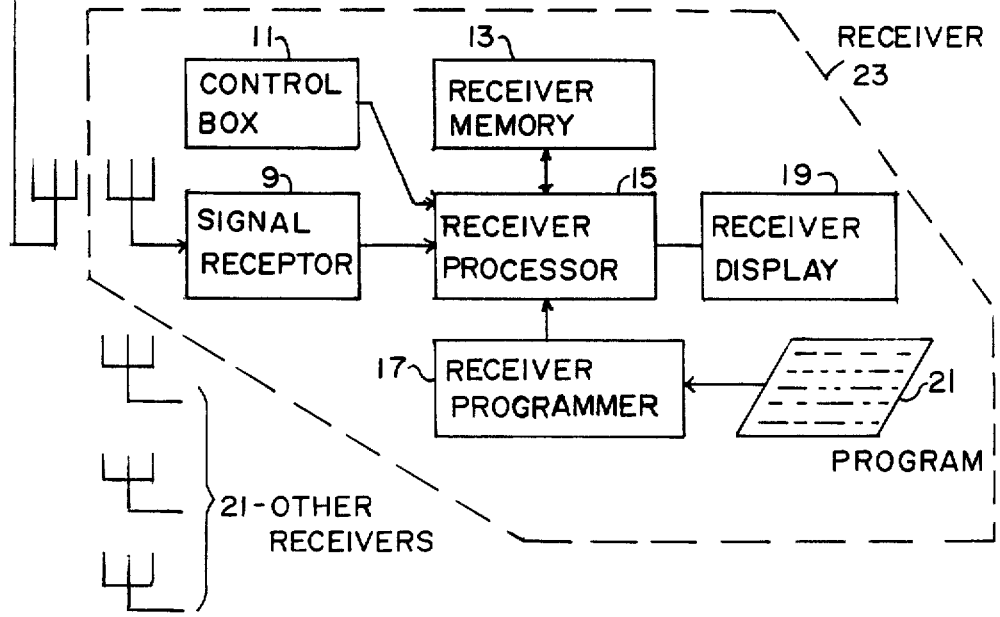
FIG. 2

```
1234 CORNWALLIS SURRENDERS
  At 9:55 this morning a white flag was raised
 over British positons in Yorktown. Weary sold-
```
FIG. 3

```
6234           DIRECTORY
1 Columbus Discovers America
2 Elizabeth Taylor Discovers Men E Col. Sanders Discovers Chickens
F Arstrong Discovers the Moon
```
FIG. 4

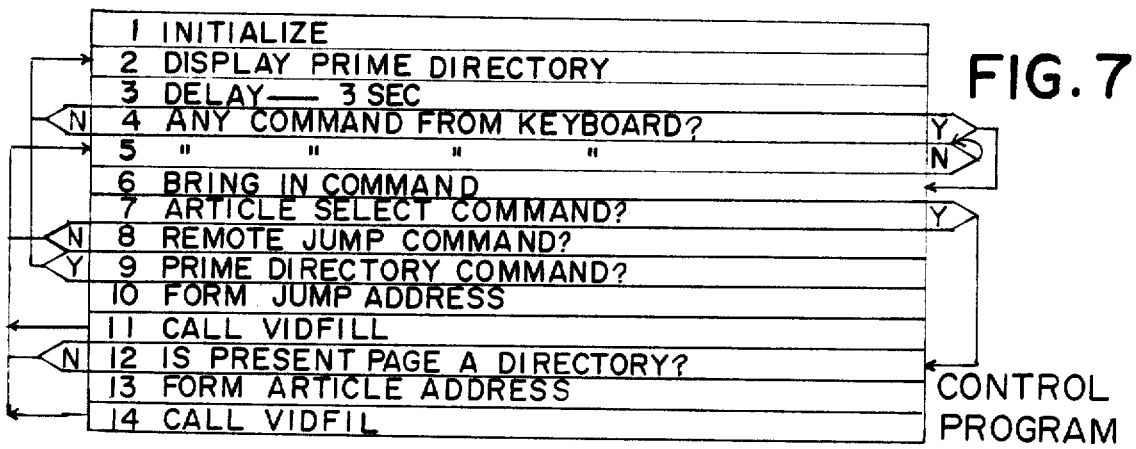

FIG. 7

```
 1  INITIALIZE
 2  DISPLAY PRIME DIRECTORY
 3  DELAY — 3 SEC
 4  ANY COMMAND FROM KEYBOARD?          Y
 5   "    "    "     "                  N
 6  BRING IN COMMAND
 7  ARTICLE SELECT COMMAND?             Y
 8  REMOTE JUMP COMMAND?
 9  PRIME DIRECTORY COMMAND?
10  FORM JUMP ADDRESS
11  CALL VIDFILL
12  IS PRESENT PAGE A DIRECTORY?
13  FORM ARTICLE ADDRESS
14  CALL VIDFIL
```
CONTROL PROGRAM

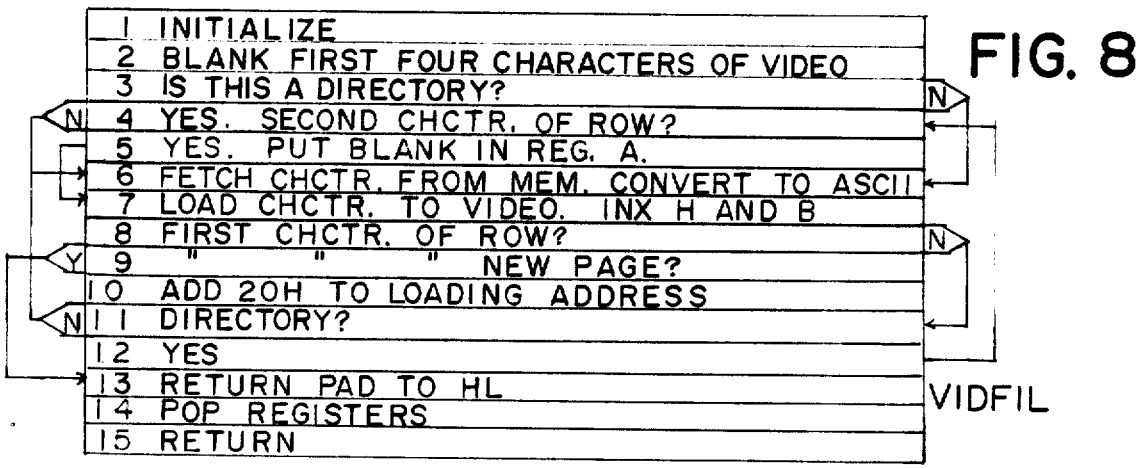

FIG. 8

```
 1  INITIALIZE
 2  BLANK FIRST FOUR CHARACTERS OF VIDEO
 3  IS THIS A DIRECTORY?                N
 4  YES. SECOND CHCTR. OF ROW?
 5  YES. PUT BLANK IN REG. A.
 6  FETCH CHCTR. FROM MEM. CONVERT TO ASCII
 7  LOAD CHCTR. TO VIDEO. INX H AND B
 8  FIRST CHCTR. OF ROW?                N
 9   "     "     "   NEW PAGE?
10  ADD 20H TO LOADING ADDRESS
11  DIRECTORY?
12  YES
13  RETURN PAD TO HL
14  POP REGISTERS
15  RETURN
```
VIDFIL

TRANSMITTER EXECUTIVE PROG.

FIG. 13
CLPG-CLEAR PAGE

| | |
|---|---|
| 1 | CALL PADS |
| 2 | BLANK TO A |
| 3 | A TO M, V |
| 4 | INX B / A TO V |
| 5 | " H, B |
| 6 | HL = X(XXX0)00 |
| 7 | Y / H = H - 02 / L = 04 |
| 8 | B = B - 04 / C = 04 |
| 9 | XOR A / RET. |

FIG. 14
PADS-TEXT PAGE ADDRESSES

| | |
|---|---|
| 1 | 04 TO L / L TO C |
| 2 | FE TO A / ANA H / A TO H |
| 3 | D8 TO B |
| 4 | XOR A / RET |

FIG. 15
KBD-KEYBOARD

| | |
|---|---|
| 1 | PUSH D / CURSOR CHCTR TO E / STC / 00 TO MICHA |
| 2 | DATA READY? |
| 3 | MICHA TO MICHB |
| 4 | KCH TO A |
| 5 | ICH TO D |
| 6 | E TO V |
| 7 | D TO E |
| 8 | CALL DELAY |
| 9 | CMC |
| 10 | CARRY? |
| 11 | A TO MICHA |
| 12 | POP D / RET |

FIG. 16
BC- BACK BY CHCTR

| | |
|---|---|
| 1 | IS ICH FIRST OF ROW? |
| 2 | IS " " PAGE? |
| 3 | SUBTRACT 20 FROM BC |
| 4 | DCX H AND B |
| 5 | XOR A / RET |

FIG. 17
FC-FWD BY CHCTR

| | |
|---|---|
| 1 | IS ICH LAST OF ROW? |
| 2 | IS " " PAGE? |
| 3 | ADD 20 TO BC |
| 4 | INX H AND B |
| 5 | XOR A / RET |

BACK BY ROW—BR

FR—FWD BY ROW

BP—BACK BY PAGE

FP—FWD BY PAGE

PDIR—PARENT DIRECTORY

PMDIR—PRIME DIRECTORY

NART—NEW ARTICLE

CLROW—CLEAR ROW

TF—TRANSFER

DLY—DELAY

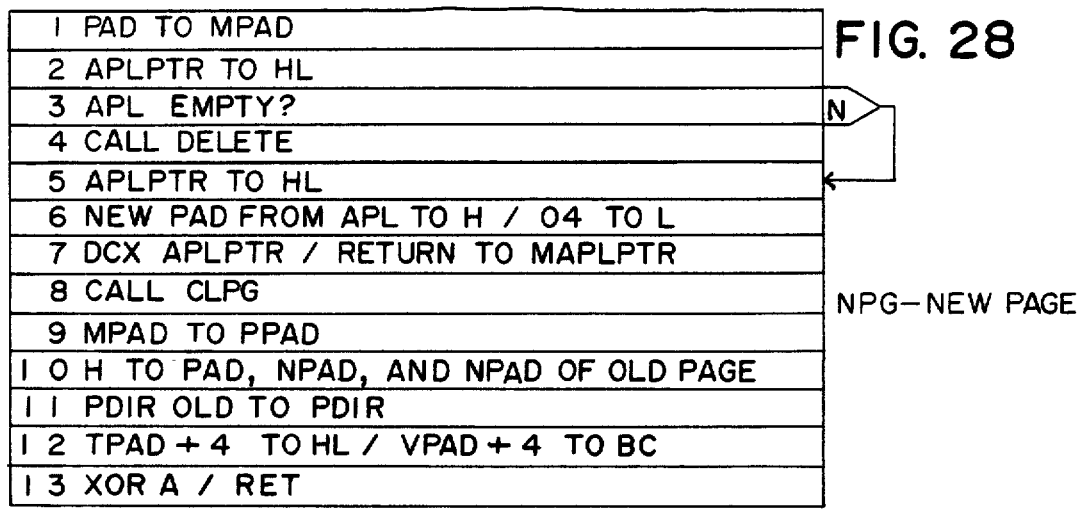

FIG. 28

NPG—NEW PAGE

| 1 | PAD TO MPAD |
| 2 | APLPTR TO HL |
| 3 | APL EMPTY? |
| 4 | CALL DELETE |
| 5 | APLPTR TO HL |
| 6 | NEW PAD FROM APL TO H / 04 TO L |
| 7 | DCX APLPTR / RETURN TO MAPLPTR |
| 8 | CALL CLPG |
| 9 | MPAD TO PPAD |
| 10 | H TO PAD, NPAD, AND NPAD OF OLD PAGE |
| 11 | PDIR OLD TO PDIR |
| 12 | TPAD + 4 TO HL / VPAD + 4 TO BC |
| 13 | XOR A / RET |

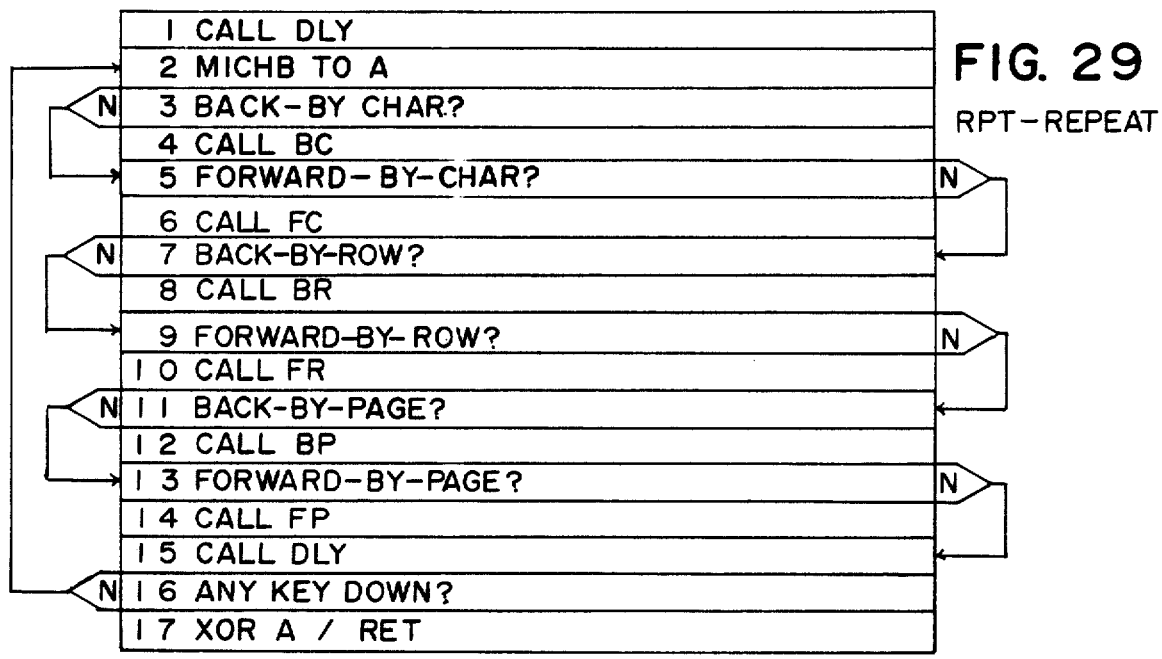

FIG. 29

RPT—REPEAT

| 1 | CALL DLY |
| 2 | MICHB TO A |
| 3 | BACK-BY CHAR? |
| 4 | CALL BC |
| 5 | FORWARD-BY-CHAR? |
| 6 | CALL FC |
| 7 | BACK-BY-ROW? |
| 8 | CALL BR |
| 9 | FORWARD-BY-ROW? |
| 10 | CALL FR |
| 11 | BACK-BY-PAGE? |
| 12 | CALL BP |
| 13 | FORWARD-BY-PAGE? |
| 14 | CALL FP |
| 15 | CALL DLY |
| 16 | ANY KEY DOWN? |
| 17 | XOR A / RET |

DLT-DELETE

TMA – TRANSMIT ARTICLE

APAD – OBTAIN PAD FOR PRESENT PAGE

TMP – TRANSMIT PAGE

QUINEWS-ELECTRONIC REPLACEMENT FOR THE NEWSPAPER

CROSS REFERENCE TO RELATED APPLICATION

This is a continuation-in-part to Application Ser. No. 06/404,325, now abandoned, filed 8-2-82.

BACKGROUND OF THE INVENTION

1. Field of the Invention

Field is that of electronics and computers. Microprocessors, radio signals, and CRT displays are involved.

2. Description of the Prior Art

Poignet et al, U.S. Pat. No. 4,361,848 discusses a teletext system in which the news is formed into pages and transmitted on the vertical retrace of a TV signal. The entire text of the news is transmitted repetitively. The user pulls selected pages for viewing as they fly by. A first objection to the system is that there is a delay between the time the user specifies which page he desires to read and the time the specified page is delivered to his display. A mean time of 15 seconds is indicated. For the Quinews the desired page appears instantly. A second objection is that the piece of information is transmitted a thousand times (approximately), which means that another system (such as the Quinews) which transmits the text only once, can transmit a thousand times as much code. Expressed another way, a system such as the Quinews requires only one thousandth the bandwidth as does a Poignet system. These advantages of the Quinews over the Poignet system result from the fact that the Quinews provides mass storage at the user site while Poignet does not.

Cox U.S. Pat. No. 4,388,645 discusses a teletext system in which satelite transmission of coded pages to a cable head-end station is provided. The station stores the coded pages and then converts and retransmits the news content thereof as ordinary TV pictures. Retransmission is to end users of the news. No code is transmitted to the user site. Operationally the system is identical to the TV newscast. The only difference is that pages of print are transmitted instead of pictures. The user must watch whatever is transmitted from the head-end station. He may not select those stories in which he is interested and pass the others by. He may not read any story in depth. Whereas, with the Quinews he reads only those articles in which he is interested—and he can read them in much greater depth. Mass storage for the Cox system is at the head-end station. No storage whatsoever is at the user site. The bandwidth required for the transmission is 4.5 MHz, about 4,000 times that required by the Quinews.

Marti U.S. Pat. No. 4,303,941 describes a system similar to that of Poignet. Only a single page of display storage is at the receiver—no mass storage. Mass storage is at the transmitter. Consequently the Marti system suffers the same shortcomings as does the system of Poignet.

The following U.S. patents are cited as being of interest.

Ciciera, U.S. Pat. No. 4,233,628
Guillou U.S. Pat. Nos. 4,323,921 and 4,337,483
Hernandez et al U.S. Pat. No. 4,308,558
Marti et al U.S. Pat. No. 4,290,062
Parsons U.S. Pat. No. 4,099,258
Sechet et al U.S. Pat. No. 4,354,201

SUMMARY OF THE INVENTION

A radio transmitter transmits the news as encoded pages. At the user site a receiver delivers these encoded pages to a processor which in turn stores them in memory. A first set of pages are directory pages—listing headlines of news stories. A second set of pages are text pages—giving the text of the news stories. The user views a directory page on a CRT display and selects from it an article he wishes to read. Via a keyboard he commands the computer to deliver selected pages of that article to the display.

Significant features are:

1. There is no delay between selection of a story to be read and its delivery to the display. This feature renders the Quinews superior to the Teletext system of Poignet for which the delay is approximately 15 sec.

2. The user can read in depth those articles in which he is interested. He avoids waste of time while things in which he has no interest are being shown.

For the above two reasons the Quinews is superior to the system of Cox, to the TV newscast, and to the radio newscast.

3. The headline news for the Quinews is 6 minutes old. For the newspaper it is between 6 and 53 hours old. This renders the Quinews vastly superior to the newspaper.

4. Each page of news is transmitted only once. In the Cox, Poignet, and Marti systems each page is transmitted perhaps a thousand times. Consequently a thousand times as much news can be transmitted in the Quinews system as can be transmitted in the system of Cox or the system of Poignet. Expressed another way, the Quinews requires only 0.1% of the spectrum space required by the previous systems.

BRIEF DESCRIPTION OF THE DRAWINGS

FIG. 1 is a sketch of a Quinews installation.

FIG. 2 is a block diagram of the Quinews system.

FIG. 3 shows the top 3 lines of an ordinary text page. The 4 characters at upper left appear in the text but are ordinarily suppressed in the display.

FIG. 4 shows the top 4 rows and the bottom 2 rows of a typical directory page.

FIG. 7 is a flow diagram or the Control program of the receiver.

FIG. 8 is a flow diagram for the VidFil routine of the receiver.

FIG. 13 is a flow diagram for the Clear-page: clpg.

FIG. 14 is a flow diagram for the Page-Addresss: pads.

FIG. 15 is a flow diagram for the Keyboard: kbd.

FIG. 16 is a flow diagram for the Back-by-Character: bc.

FIG. 17 is a flow diagram for the Forward-by-Character: fc.

FIG. 28 is a flow diagram for the New Page: npg.

FIG. 29 is a flow diagram for the Repeat: rpt.

DESCRIPTION OF PREFERRED EMBODIMENT

How it is Used

Figure 5:
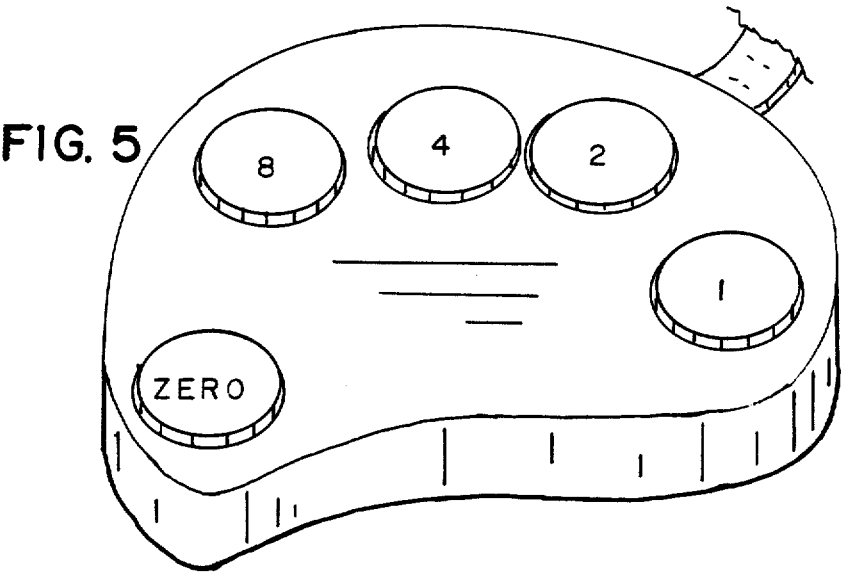
FIG. 5 is a sketch of a typical control box.

Any time of day or night that the user desires to bring himself up-to-date on the news he sits down before his "Quinews" (See FIG. 1). He turns the display on. Immediately a directory listing 15 headlines appears. Headlines are numbered down the left side. If he desires to read article No. 5 he pushes a combination of keys representing "5" on the control box. Immediately the first page of Article No. 5 appears on the display. There are 10H rows of 20H characters per row. He scans the first page. If he desires to read more of this article, he pushes the "Next Page" combination on the box and the next page appears on the display. If he desires to go back to the Headlines and select another article, he pushes "Parent Directory". He might select "Features" which would cause a directory listing of 15 features to appear on the display, from which he could select "Bridge Game", "Stock Market", or perhaps "Advertising". The last would bring up another directory from which he might select "Clothing", which would bring up another directory from which he might select "Pants", which would bring up advertisements from several stores, each touting trousers for sale.

How it Works a. A radio transmitter transmits the news as encoded pages, continuously. It updates the headlines as the stories come in. It updates the bridge game once per day, the stock market twice, and advertisements at the beck of the sponsor.

b. A radio receiver in the home feeds these encoded pages to a microcomputer which stores them in memory.

c. The user with his control box (user-input-device) selects "pages" from memory for viewing on his display.

Significant Features a. Collection, editing, and broadcast of the news is paid for by advertising.

b. The user can read in depth those articles in which he is interested and pass over articles in which he is not interested. Just as he does with a conventional newspaper. He can do this just as he cannot do with a TV or radio newscast.

c. Top news on the Quinews is approximately 6 minutes old. Top news in the newspaper is between 6 and 53 hours old. The Quinews in this regard is vastly superior to the newspaper.

d. The Quinews has associated with it no "paper" to print, deliver, and later recycle. It has associated with it no costly presses. It has no union gentlemen to go on strike. e. Cost of the Quinews is $50.00 if the user already has a microcomputer. Some $250.00 if he does not.

The Encoded Page

Consider Encoded Page 5 of FIG. 2. This is a set of 200H encoded characters arriving in sequence from an editorial office. These characters are arranged into 10H rows of 20H characters each. Each news article is divided into a sequence of these encoded pages.

The first two rows of the first encoded page of a typical news artcle appear in FIG. 3. A headline appears in the first row. Text begins in the second. At the left of the first row appear the digits "1234". These are housekeeping characters and are identified as follows:

1. pad—"Page Address". This character specifies where in Memory 13 of FIG. 2 this page is to be stored. The first encoded page is stored at location 0200H. The second at 0400H. Third at 0600H. The last at FE00H. This page-address is actually the memory address of the first character of the page. The following 1FF characters of the page occupy the following 1FF memory locations. Since all page-addresses end in 00, the page address is completely specified by the upper byte only. The encoded pages pass to Transmitter 7, thence via radio waves to Signal Receptor 9, and thence to Receiver Processor 15. Processor 15 obtains the pad from the encoded page and stores the encoded page at that addrress in Receiver Memory 13. Memory 13 stores the encoded pages at locations specified at the transmitter. In more sophisticated systems much more memory will be used. The pad will consist of two or more bytes. It becomes a set of encoded characters. In the prototype system page length and memory size were selected so that the pad reduced to a single byte. The pad becomes a set of characters consisting of one character only.

2. ppad—"Previous-Page-Address". The pad of this previous page appears in this ppad position. The reader of the Quinews uses the ppad of a current page to return to the previous page and place it in the display. He can repeat this procedure to review all previous pages of the article. For the first page of each article there is no previous page and ppad is made equal to pad.

3. npad—"Next-Page-Address". Use of npad is similar to the above use of ppad. It permits the reader to scan forward through an article. For the last page of an article there is no npad. The pad of the current page is inserted in the npad position.

4. pdir-"Parent Directory". This is the pad of the directory page from which the Article containing the current page was taken. After the reader has read as much of the current article as he desires, he uses pdir to return to the parent directory. From it he may select a new story. Or he may return to its parent directory. The operation may be repeated until he reaches the "prime directory"—which is a directory containing top headlines of the moment and from which operation of the Quinews receiver begins.

The Two Types of Pages

1. A first set of encoded pages are called Directory Pages. They list the articles from which the user may select those he wishes to read. The first 4 rows and the last 2 rows of a Directory page are shown in FIG. 4. The following points are significant:

a. The usual housekeeping information is carried in the first 4 characters indicated by the digits 1, 2, 3, and 4 at upper left. The title appears in the first row.

b. There are 15 headlines, each is numbered as indicated. The 14 and 15 are represented by E and F respectively. It is not desirable to use letters to represent numbers, but the practice is established in the technology.

c. A column of blanks follows the numerals. In the encoded-page, each of these positions is filled with an "hpad" (headline pad), the pad for the first page of the article corresponding to the headline. Processor 15 of FIG. 2 blanks each hpad before feeding a directory page to the display.

d. From the display page the reader selects that headline whose article he wishes to read. He pushes its sequence number on his control box. Processor 15 goes to the corresponding row of the directory, extracts the hpad, and forms the address for the respective page. It pulls that page from memory, and sends it to the display.

e. Each Directory constitutes a subset of the directory pages.

2. The second set of pages are Text Pages. They present the text of the articles.

The Control Box (User Input Device)

See FIG. 5. The buttons labelled 1, 2, 4, and 8 are used in selecting a page to be displayed. Those keys are depressed the sum of whose labels equals the sequence number of the headline selected. For instance, headline No. 6 would be selected by depressing buttons 2 and 4 at the same time. Headline No. 13 would be selected by depressing buttons 1, 4, and 8 simultaneously. The zero key is used in generating the "relative jump" commands:

Z 1 Display the previous page
Z 2 Display the next page
Z 3 Display the parent directory
Z By itself, display the Prime Directory A combinational keyboard is the preferred user input device. A QWERTY keyboard could be used—that or one of the many special keyboards which are presently available. A voice recognition device will no doubt become useful in the future. Wireless units will probably be popular with large displays.

The Prime Directory

When the Quinews (the combination of the signal-receptor, receiver-processor, receiver-memory, receiver-display, and control box) is first turned on, it puts the "Prime Directory" into the display. The Prime Directory gives the top headlines of the moment and the titles of subordinate directories. It is the one page which has a permanent address—it is always at address 0200H. It can always be placed in the display by striking the zero key by itself. It serves as a base page—a "home" position.

Oftentimes the user will be interested in just monitoring the news to see if something exciting is occurring, in which case he will leave the Quinews running and displaying the prime directory. In this "Monitor" mode, the Quinews updates the display ever 3 seconds by transferring the 0200 page from memory to the display. This insures that when a new prime directory is received into memory, it will be transferred immediately to the display.

Bulletin Mode

Should a tornado approach or a massive traffic snarl develop, the transmitter may move to "Bulletin" mode. It then transmits a page of text to the 0200H position. This causes the bulletin to be displayed as rapidly as it is received. Signals could be incorporated which would cause the display to be activated and an attention tone to sound.

Memory Control

Receiver Memory 13 will generally be 95% filled. The remaining pages are available for entering new articles. As the number of available pages drops below the 5% figure, editors at the transmitter select articles to be deleted. Pages assigned to those articles then become available for new articles. Human judgement is necessary for making the decision as to what articles to delete, as well as what articles to add. The pads for the deleted pages are then placed on the apl (available page list). Pads are drawn from the apl as new articles are transmitted. A computer at the transmitter is used to insert the proper pad, ppad, npad, and pdir into every transmitted page. It also inserts the proper hpad into each row of each directory page.

Startup

Figure 6:
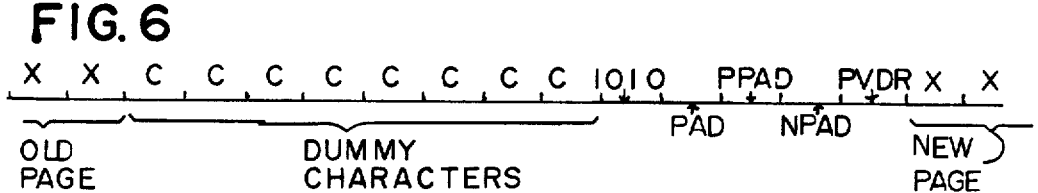
FIG. 6 is diagram showing the sequence in which characters are transmitted at the end of one page and the start of a new page.

When the Quinews receiver is first turned on, the transmitter will most likely be transmitting text. The receiver must wait until it receives the pad for the next page before it starts storing in text memory. To enable the Quinews to know when a pad is to be received, an AA (10101010) is transmitted immediately before the pad of each page, as shown in FIG. 6. An AA is not a character in Rowcode (the code used by the Quinews). Consequently it ought never appear in straight text. As soon as the Quinews sees an AA, it knows that the next character will be a pad. It then uses this next character as a loading address for the incoming page.

Although the AA will not appear in alpha text, it can appear as a number, or be noise-generated. The chance of either is rather remote. No such trouble has been encountered thus far. If such trouble should develop, then two cascaded characters could be used to reduce the chance of error by another order of magnitude. The second character might well be F0.

Noise

Noise will generally cause an error in the bit structure of a character, which in turn will cause a word in the display to be misspelled. Redundancy of the English language causes such an error to do virtually no harm. However, sometimes the noise will cause a character to be added or deleted. An added character causes the remainder of the text for that page to be displaced to the right. But the next page will be properly synchronized and fed to memory in the proper manner. Consequently no harm is done. The added character is a small nuisance only.

But if one or more characters are lost, the Quinews will not be looking for the AA unti after it has been received. Consequently the next page will be lost. To reduce the chance of such, the transmitter inserts 8 dummy characters before an AA (see FIG. 6). Deleted characters then cause only the loss of an equal number of these dummy characters.

Directory Page Transmission

In general, about 8 pages of text will be transmitted and then a directory page or pages. Only after the text pages of an article have been transmitted should a headline for the story be incorporated into a directory.

Similarly, a directory should be transmitted from which the headline for a story is deleted before the memory pages of that article can be used in a new article. Otherwise the user might note a headline, call for the respective article, and find the pages not present. Note that bit zero of a pad is always zero. It carries no information. This results from the fact that each page is 200H characters. Consequently bit zero is available for other use. Note also that the Quinews must know when the current page is a directory. To provide this information, the transmitter sets the zero bit of the pad for a directory page and resets it for the text page. The Quinews determines the type of page by examining this bit.

Rowcode

The two most common codes are ASCII and EBCDIC. The latter is used only by IBM and those supplying IBM compatible equipment. Both codes are for use with the decimal numbering system and do not well accommodate a hexadecimal system such as used by computers: Increased use of computers will bring with it a steady shift from the decimal system over to the hexadecimal system. Consequently it was felt that it would be better to drop the two older codes in favor of a computer compatible code such as Rowcode. A conversion chart giving conventional characters, their Rowcode equivalents, and their ASCII equivalents is given in Table I. Rowcode uses an 8-bit code and is arranged to accommodate a combinational keyboard, giving rise to several oddities in the code. A total of 100H characters are available. Enough for the hexadecimal digits, upper and lower case alphabets, the Greek alphabet, a host of punctuation and special characters, and a host of phonemes. Table I assigns characters to less than half the available codes.

Receiver Programmer 17 of FIG. 2

In the prototype this was an Eprom which had been internally modified (programmed) so that it can cause the system to function as above described. The Eprom is similar to the cam programmers which have been used in industry for many years. But it is equivalent to a cam programmer having several thousand cams and attendant switches. A high-powered microscope is required to see the "cams and switches" of an Eprom. The setting of the cams is electrical in nature and invisible.

This programmer is the brain of the Quinews. However, it is not customary to discuss the physical modifications which have been made to the Eprom, but rather to speak of the program in accordance with which these physical modifications have been made. We shall conform to custom.

There are three routines of interest:

a. Control Program. This is a supervisory program which responds to user commands and coordinates the operations of the system.

b. VidFil. This is a routine which, when given a pad, transfers the respective page from memory to the display.

c. Receiver Program (Rcv). When a transmitted character is passed from Signal Receptor 9 of FIG. 2 to Processor 15, an interrupt is generated. Processor 15 then jumps to this Rvc routine. This routine causes received characters to be loaded into their proper positions in memory.

The programs were written or a computer using an 8080 microprocessor and an SSM video board. Maximum address of memory was FFFF. Which corresponds to 10 HK of memory or 64 DK of memory.

The Control Program

See FIG. 7 for the flow diagram. The following numbered comments pertain to respectively numbered steps of the diagram.

1. Initialize. Disable Interrupts—to prevent the RCV program from trying to operate before a stack pointer has been specified. Initialize the stack pointer. Put a 00 into rsw (rsw to be discussed later). Lastly, enable interrupts.

2. Display Prime Directory. It is located at 0200H.

3. Delay—3 sec. During this delay the Prime Directory remains on the display. Then it is updated.

4. Any Command from Keyboard? If not, then the Prime Directory is moved again to the display.

5. Any Command from Keyboard? This is a fast loop—no 3 second delay.

6. Bring in Command. Command comes from the keyboard.

7. Article Select Command? There are three possibilities. The command may be an Article Select command, a Remote Jump command (ppad, npad, pdir, or pmdir). Or, the command may be illegitimate. Step 7 checks to see if the command is an Article Select command.

8. Remote jump? If the command was not an Article Select command, then was it a Remote Jump command? If not, then the command is illegitimate and the operation is aborted.

9. Prime Directory Command? If the command is a Prime Directory command then a jump back to the Prime Directory loop is made.

10. Form Jump Address. The one remaining possibility is that the command was a ppad, npad, or pdir command. In which case the appropriate pad is drawn from the current page and placed in the upper byte of a jump address. The lower byte is zeroed.

11. Call VidFil. This puts the new page into the Display. And returns the system to looking for a new command from the keyboard.

12. Is Present Page a Directory? An Article Select command is legitimate only if the current page (the page being shown on the Display) is a directory. This step checks for this requirement. If the current page is not a directory, the operation is aborted.

13. Form Article Address. If the current page is a directory, then the hpad is drawn from the selected row and used as the upper byte of a jump address. The lower byte is zeroed.

14. Call Vidfil. This puts the called-for page into the Display and returns the system to looking for a keyboard command.

VidFil Routine

The pad of the page to be moved to video must be in HL. The flow diagram appears in FIG. 8. The following numbered comments pertain to correspondingly numbered steps of the flow diagram.

1. Initialize. Put the upper byte of the code converter address into scratchpad register D. Put the pad of the video page into pointer BC. Save the pad of the text page to be displayed.

2. Blank First Four Characters of Video. These are housekeeping characters. They need not be displayed.

3. Is this a Directory? It will be a directory if the least significant bit is set.

4. Yes. Second character of Row? This is the first step of a loop which moves the characters from memory to video. Recall tat the second character of each directory row is an hpad and that it is to be blanked in video. Steps 4, 5, and 7 accomplish this.

6. Fetch character from Memory. Convert to ASCII. In case the page being delivered to the display is not a directory—it must be a text page. In which case the address in memory point HL is used to fetch a character from memory. The character is converted to ASCII since the SSM video board used in the prototype required an ASCII input.

8. First Character of Row? This checks to see if we have finished one row.

9. First Character of New Page? If it is the first character of a new page, then we are finished.

10. Add 20H to Loading Address. In the SSM video board operating in the 20H character-per-row mode, the second 20H characters of each set of 40H characters are ignored. This step jumps over these ignored characters.

11 & 12. If the page is a directory, and the character is the second of a row—then the character must be blanked. Steps 11, 12, 4, 5, and 7 put the blank into the display. If the page is not a directory, the operation is aborted.

Receive Routine (Rcv)

When the Receptor of FIG. 2 receives an incoming character, it raises a flag. Upon seeing the flag, the Processor interrupts the program it is running and processes the character. After it has properly loaded the character into memory, it returns to the program it was running prior to the interrupt.

Figure 9:
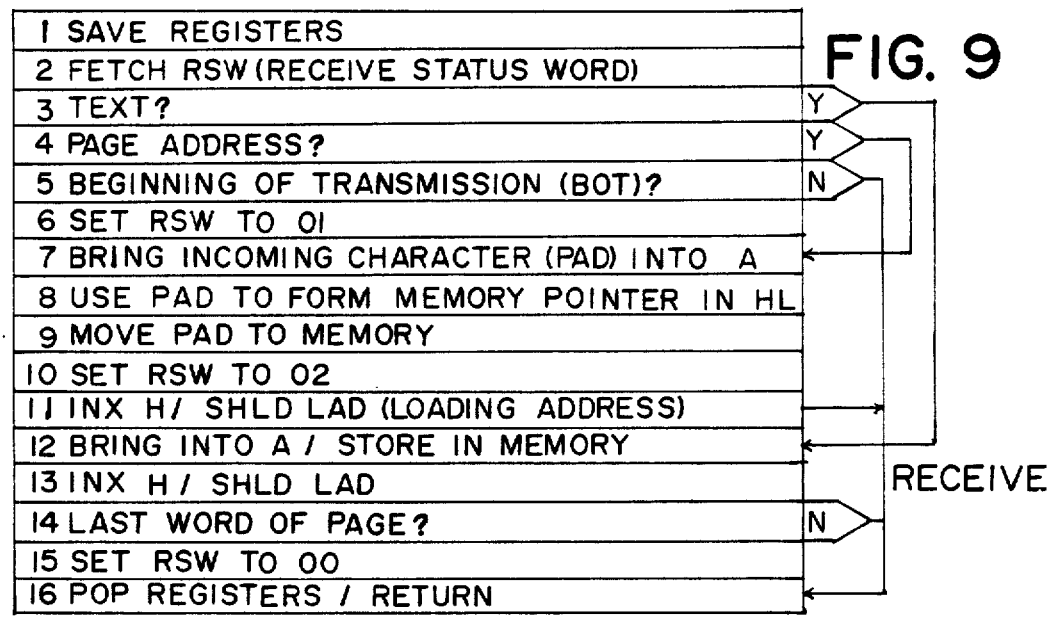
FIG. 9 is a flow diagram of the Rcv routine of the receiver.

The following numbered comments pertain to correspondingly numbered steps of the flow diagram given in FIG. 9.

2. Fetch rsw—(Receive Status Word). This word is stored at a location in memory called mrsw. Rsw tells the processor what portion of the receiver-program the processor should use in processing the next incoming character. Upon receipt of that incoming character, the processor consults rsw and then uses the specified portion of the program in processing the incoming character. If the incoming character is one of the eight dummy characters—it is ignored. If it is an AA—the processor gets ready to receive a pad. If it is a text character, the processor gets ready to store it in memory.

3. Text? Incoming character is text if rsw is 02.

4. Page Address (pad)? Incoming character is a pad for the incoming page if rsw is 01.

5. Beginning of Transmission (BOT)? Look for a "Beginning of Transmission" character (AA) if rsw is a 00.

6. Set rsw to 01. The BOT character (AA) has been received. Rsw is changed to 01. This will cause the Processor to treat the next incoming character as a pad for the incoming page.

7. Bring Incoming Character (pad) into A. The character brought in is that held in the Receptor.

8. Use pad to form Memory Pointer in HL. This pointer will then be used to load the incoming page into memory.

9. Move pad to memory. This causes pad to occupy that memory position for which it has been used to form a pointer.

10. Set rsw to 02. This will cause the processor to treat the next character as text.

11. Inx H, SHLD Lad (Loading Address). Since the first character of the page has been loaded to memory, the pointer (HL) is incremented to point to the next position. The pointer is then stored in memory. It will be retrieved when the next character arrives.

12. Bring into A / Store in Memory. Character is stored in Memory at that location specified by the pointer stored in Lad.

13. Inx H / SHLD Lad. This prepares the pointer for the next character.

14. Last Word of Page? If it is, then the job is done.

15. If it was, then rsw is set to 00. This will cause the system to look for the BOT character for the next page.

Hardware of the Receiver

Transmitter 1 of FIG. 2 in the prototype consisted of a casette recorder interface board built by MITS and a wireless intercom unit built by RCA. The interface board produced an FSK signal in which a 2,025 HZ signal represented logic 0 and a 2,225 HZ signal represented logic 1. The wireless intercom accepted this signal and amplitude modulated it onto a 175 KHZ carrier. The resultant signal was coupled to the 60 HZ line. In a more modern system a radio transmitter similar to that used by police could be used.

Signal Receptor 9 of FIG. 2 in the prototype system was the receiver section of an RCA wireless intercom. In a commercial system it would be a radio receiver matching the selected transmitter.

Control Box 11 in the prototype was a combinational keyboard similar to that discussed in U.S. Pat. Nos. 4,067,431 or 4,490,056. In a preferred commercial system the control box would still be a combinational keyboard. Briefly, the combo keyboard has one key for each finger. Keys are depressed in combinations much as a piano is played. The combinations generate computer words directly. However, most installations will probably use a QWERTY keyboard—because of sales factors. A voice input device, an infrared remote control system, and an ultrasonic beam unit are examples of other devices which could be used. Probably most input will be via modem and arriving at the transmitter via telephone lines from an editing office remotely located. The generic term for the several units is "Receiver-Input-Device".

Other receivers 24 of FIG. 2 are each identical to Receiver 21.

Figure 10:
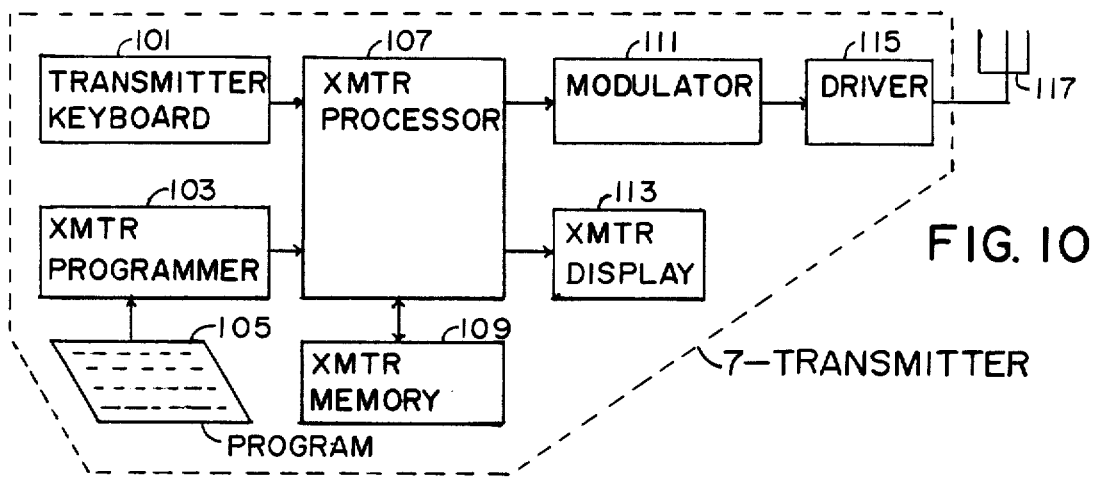
FIG. 10 is a block diagram for the transmitter.

Details of Transmitter. See FIG. 10. Keyboard 101 (transmitter-input-device) of Transmitter 1 enables an operator to enter successively the encoded characters of a page of news. Each page consists of 10H rows of 20H characters per row—a total of 200H characters. A portion of Memory 109 is referred to as Text Memory and is used for storing these pages of news. Each page being 200H characters permits page boundaries to be adjusted so that the first character of each page has an address described by— xxxx xxx0 0000 0000

—where each x means that the digit may be either 1 or 0. A more compact notation is— x(xxx0)00.

Processor 107 feeds each character to Display 113. There a Display Page of 10H rows of 20H characters per row is assembled—permitting the operator to check his keying. Processor 107 carries out successive instructions of Program 105 stored in Programmer 103. A news article will consist of several such pages. After all pages of the article have been assembled in memory 109 and verified by the operator, the operator commands the system to transmit the article. Processor 107 then delivers successive characters of each successive page to Modulator 111. Modulator 111 and Driver 115 work together to modulate the characters onto a signal suitable for transmission to the several receivers of FIG. 2.

Keyboard 101 in the prototype was a combinational keyboard such as discussed in U.S. Pat. No. 4,067,431. In a preferred commercial system it might well be replaced by a conventional QWERTY keyboard such as widely used today, or by a special keyboard custom designed for the application. The generic name for devices to enter data to the processor is "transmitter-input-device".

Programmer 103, Processor 107, Memory 109, and Display 113 in the prototype were identical to corresponding units of the receiver.

In the prototype, Modulator 111 was the transmitter portion of a MITS board designed for use with a magnetic tape system. In a preferred commercial system, Modulator 111 and Driver 115 would be combined into a transmitter such as presently used in police systems.

Driver 115 in the prototype was the transmitting portion of an RCA wireless intercom. It developed a modulated signal having a carrier frequency of 175 KHZ and suitable for transmission over the 60 HZ line. The generic term for the Driver is "output device".

The present invention is the incorporation of mass memory into the receiver and the storage of the entire news for any point in time in this memory. The present invention does not reside in the transmitter—all components of which are commercially available and the entire operation of which is well known.

The transmitter part of major interest is Program 105. It consists of an Executive Program, several Routines which are called by the Executive, and Subroutines of those Routines. They will be discussed in order.

Figure 11:
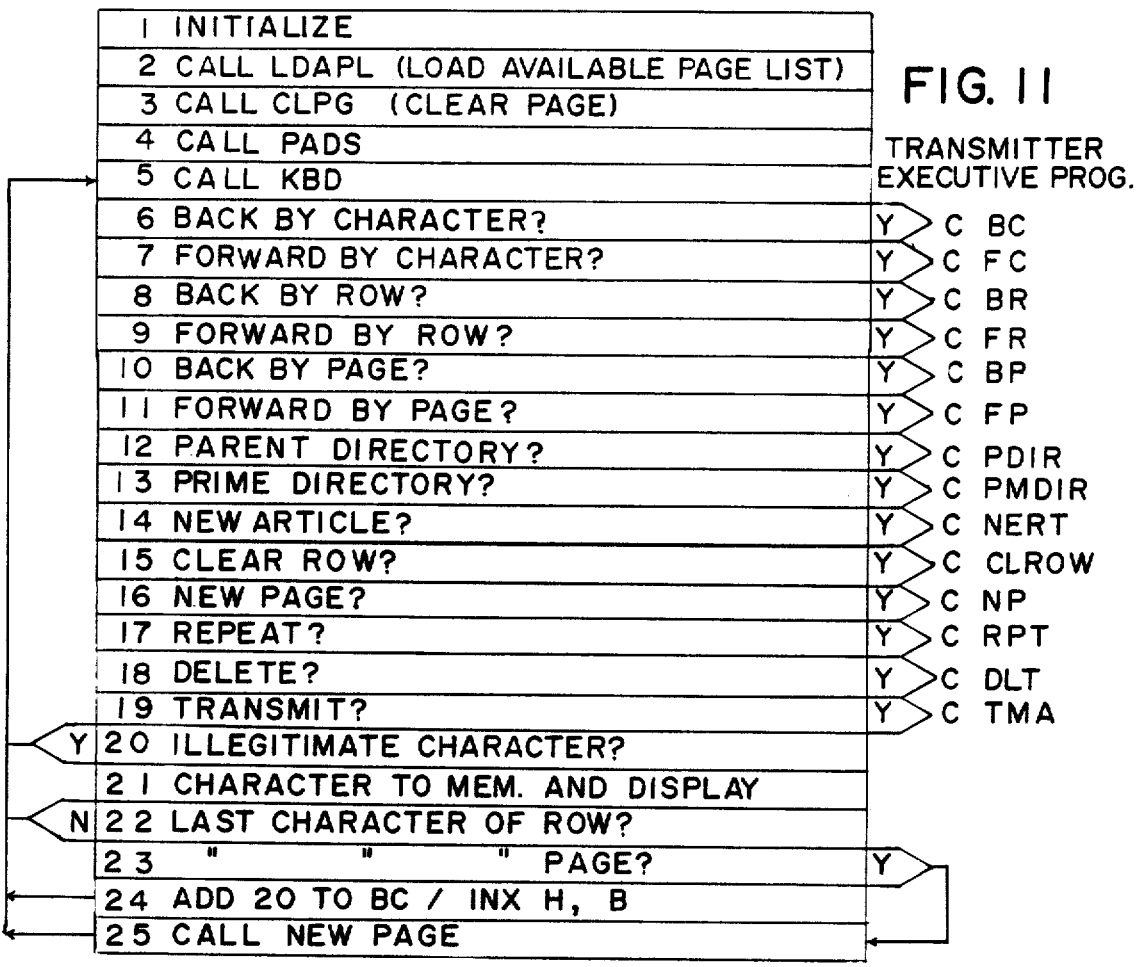
FIG. 11 is a flow diagram for the transmitter Executive program.
Figure 12:
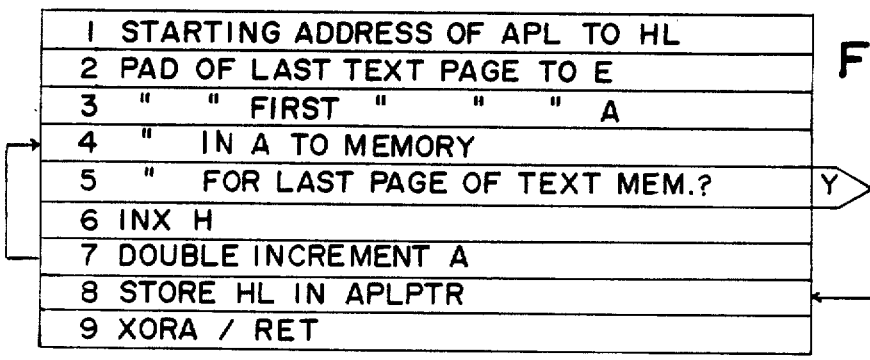
FIG. 12 is a flow diagram for the Load Available Page List program: ldapl.
Figure 18:
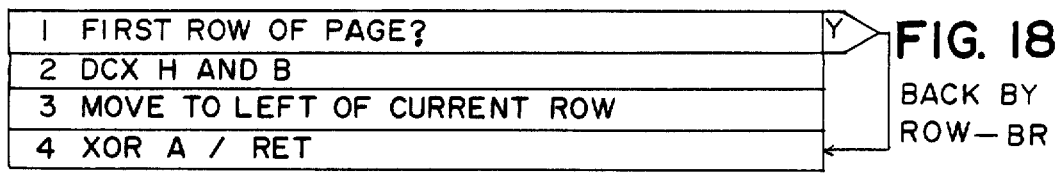
FIG. 18 is a flow diagram for the Back-by-Row: br.
Figure 19:
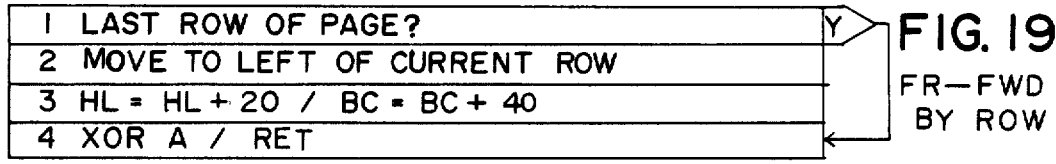
FIG. 19 is a flow diagram for the Forward-by-Row: fr.
Figure 20:
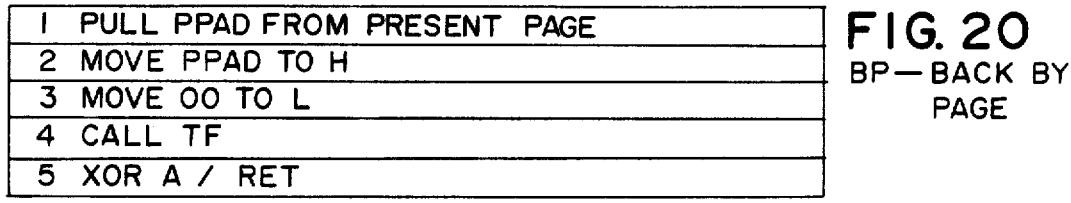
FIG. 20 is a flow diagram for the Back-by-Page: bp.
Figure 21:
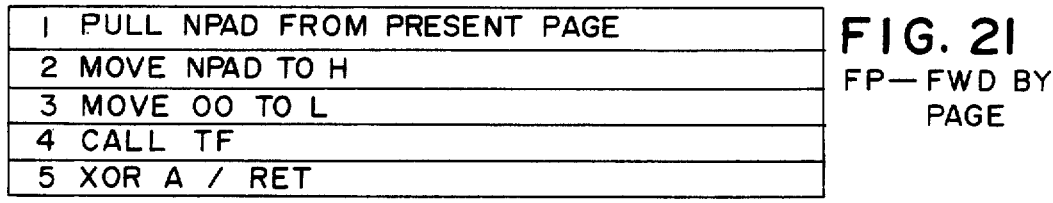
FIG. 21 is a flow diagram for the Forward-by-Page: fp.
Figure 22:
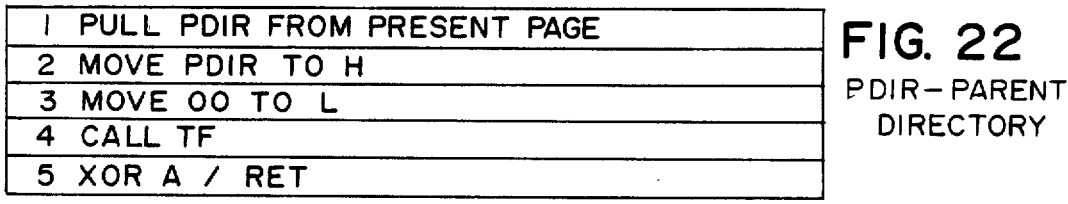
FIG. 22 is a flow diagram for the Parent Directory: pdir.
Figure 23:
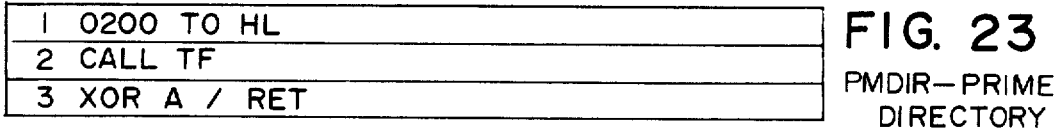
FIG. 23 is a flow diagram for the Prime Directory: pmdir.
Figure 24:
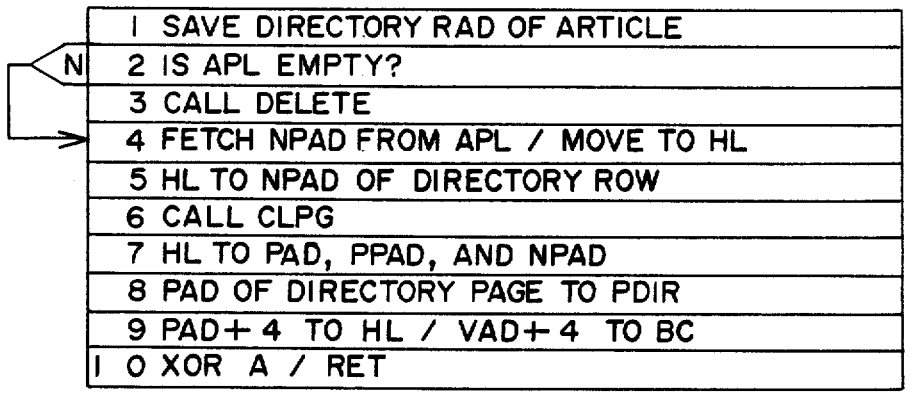
FIG. 24 is a flow diagram for the New Article: nart.
Figure 25:
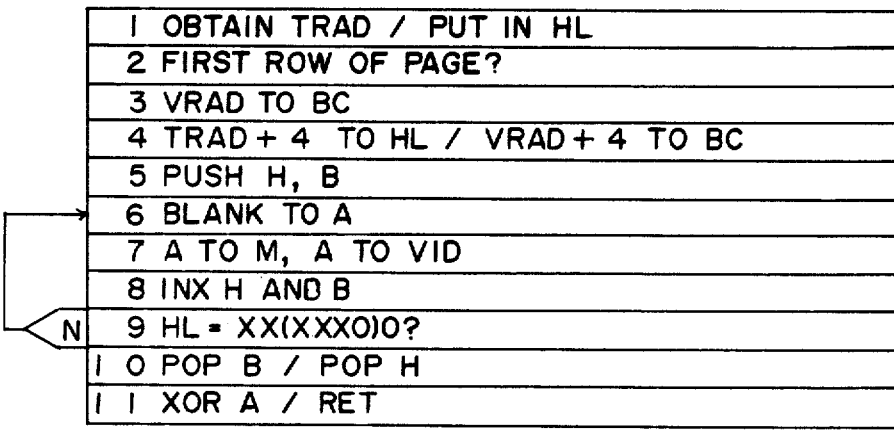
FIG. 25 is a flow diagram for the Clear Row: clrow.
Figure 26:
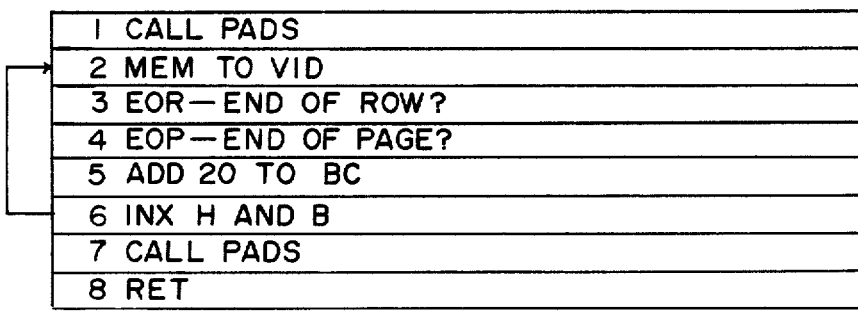
FIG. 26 is a flow diagram for the Transfer: tf.
Figure 27:
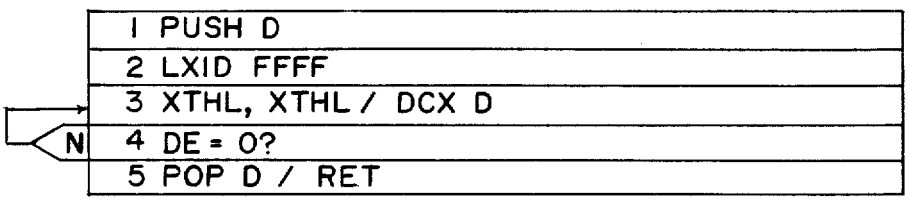
FIG. 27 is a flow diagram for the Delay: dly.
Figure 30:
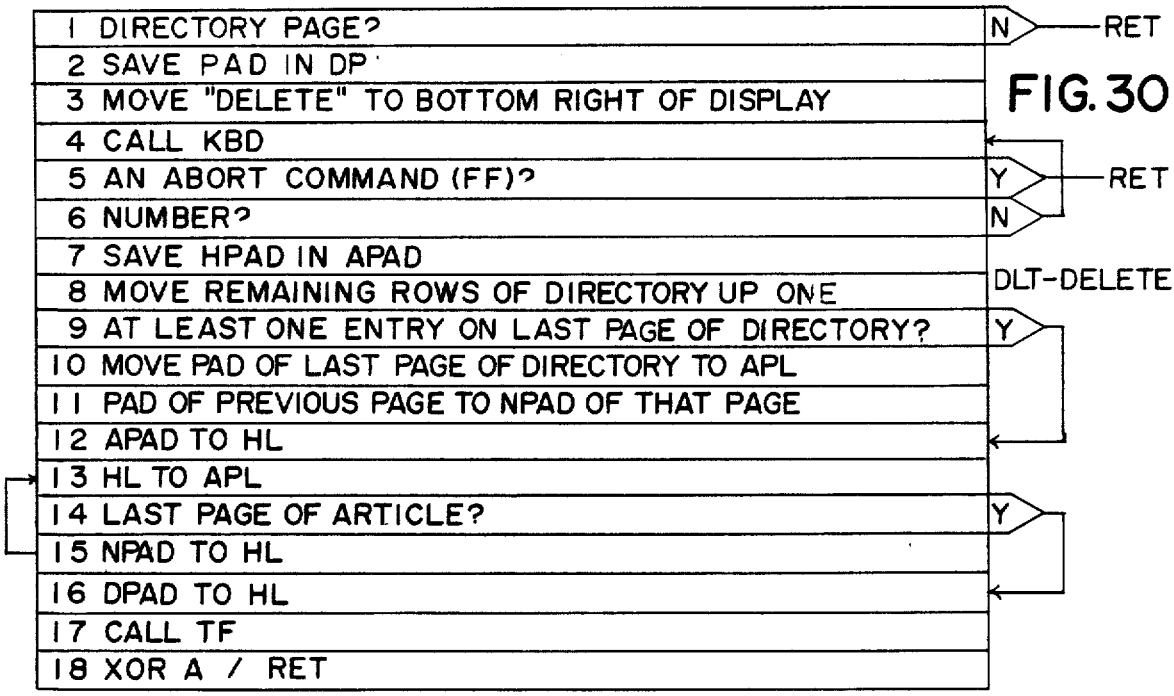
FIG. 30 is a flow diagram for the Delete: dlt.
Figure 31:
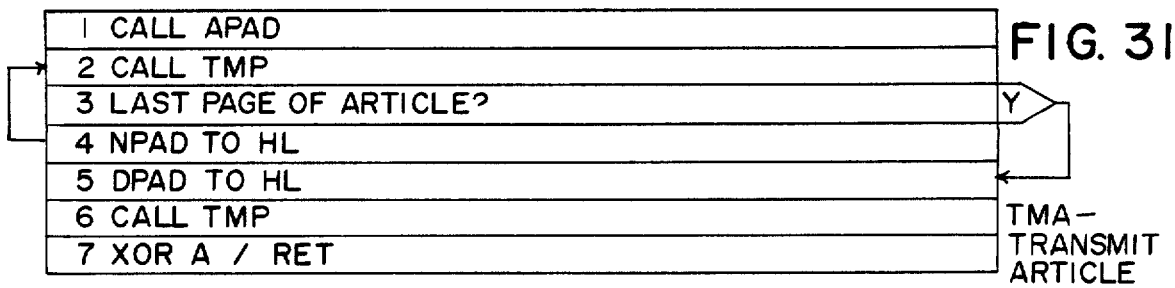
FIG. 31 is a flow diagram for the Transmit Article: tma.
Figure 32:
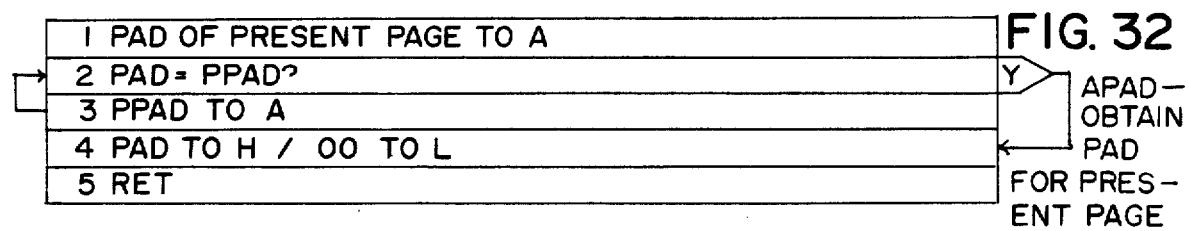
FIG. 32 is a flow diagram for the Article Pad: apad.
Figure 33:
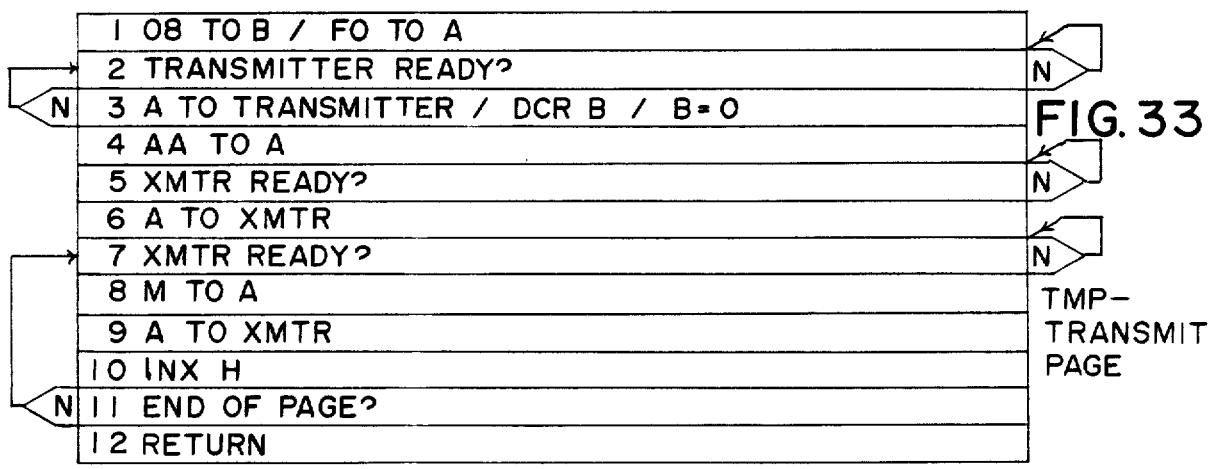
FIG. 33 is a flow diagram for the Transmit Page: tmp.

The Executive Program. This is the overall control program. See FIG. 11. The steps will be discussed in order.

1. Initialize. The stack pointer is set. Starting address of a code changer for changing from Rowcode to Ascii is placed in the D register.

2. Call ldapl (Load-Available-Page-List). When the system is turned on, all text pages are available for having articles stored in them. This Routine loads the pads of all such pages into an "Available Page List". As pages are filled with text, their pads are withdrawn from the list. As articles are deleted from the Quinews, the pads of their respective pages are returned to apl.

3. Call clpg (Clear Page). It is convenient to have the video page and the text page cleared before news is entered into them. This routine clears the two pages.

4. Call pads. A text memory pointer (index register HL of the 8080) normally holds the address of a character in a page of text memory. This character is called the "index character" (ich). This routine places the pad of the particular page in the pointer. It also places the pad of the video page in the video pointer (register BC).

5. Call kbd (Keyboard). This routine checks the keyboard for input, waits until there is an input, and then brings it in. The input can be a command ordering the system to perform a certain task or it may be a character to be inserted into an article. While waiting for the next character to be keyed, this routine causes the cursor to replace ich for half of each second. This gives a blinking cursor over ich.

6. Back by Char (bc). This routine decrements both the text pointer and the vid pointer. This is the equivalent of the backspace on a typewriter. Since a cursor appears in the display at the character specified by the vid pointer, this command moves the cursor back one space.

7. Forward by Character (fc). This is the mate of the above command. It moves the cursor forward. Which means that the vid pointer is moved forward and that the text pointer is moved forward.

8. Back by row? (br). If the cursor is at the beginning of a row, this command moves the cursor to the beginning of the previous row. If the cursor is not at the beginning of a row, this command moves it to the beginning of the row.

9. Forward by Row? (fr). This is the mate of the above command. It moves the cursor to the beginning of the following row.

10. Back by Page? (bp). Puts the previous page into the display and places the cursor over the first character thereof.

11. Forward by Page? (fp). This is the mate to the above. It puts the following page on the display and positions the cursor over the first character thereof.

12. Parent Directory? (pdir). Each article is selected from a respective directory called the parent directory. This command places on the display that page of the parent directory from which the current article was selected.

13. Prime Directory? (pmdir). This command causes the prime directory to be displayed.

14. New Article? (nart). This command is issued as the operator prepares to insert a new article. After he has entered an appropriate headline into an appropriate directory he issues this command. The processor draws a new pad from apl and inserts it into the hpad position in the headline. It then inserts it as pad, ppad, and npad in the respective text page. It then inserts the pad of the directory in the pdir position of the page. It then clears the remainder of the text page and the video page. This prepares the system to receive the entry of the next text page.

15. Clear Row? (clrow). If the operator makes several errors in a row he may wish to clear the row and start over. This command clears the row—and leaves the cursor at the beginning thereof.

16. New Page? (np). This command obtains a new pad from apl, inserts the pad in the pad and npad positions in the respective text page and in the npad position of the previous page. It then inserts the pad of the previous page in the ppad position, and the pad of the appropriate page of the parent directory in the pdir position. It then clears the remainder of the text page and the video page. Lastly, it places the cursor at the first character of vid.

17. Repeat? (rpt). It is often desirable to repeat a command a number of times. For instance, to move backward by eight characters. The Repeat command causes the previous command to be repeated until a Stop command is keyed. The Stop command is just any key depressed. The Repeat command works only with bc, fc, br, fr, bp, and fp.

18. Delete? Articles can be added only until text memory is full. Then the editor must select articles to be deleted. He does this by placing the cursor in the directory row of the article to be deleted and then issuing the Delete command. The system returns the pads of all pages of the article to apl. It also deletes the directory row for the article and moves all subsequent entries of that directory up one row.

19. Transmit? After an article has been entered and edited, it is ready to be transmitted. This command accomplishes that task. It transmits the pages of the article in succession. It then transmits the last page of the respective directory—the page to which the headline for the article was added.

20. Illegitimate Char? Recall that for each byte in Rowcode for which there is not a legitimate character, the code changer sends back a null in the A register. Each of the called routines also sends back a null in the A register. Consequently, at this point in the program, the A register holds a null for each possible illegitimate character which could have been keyed. The test performed in this step checks for this null in the A register and terminates the operation if one is found.

21. Character to Memory and Display. If the character was legitimate, then it is delivered to text memory and to vid. The latter requires the use of a code changer since the SSM video board required an ASCII input.

22. Last Character of Row? the SSM video board has two modes of operation. It can provide 20H characters per row or it can provide 40H characters per row. But it assigns 40H character spaces to every row and to provide the 20H characters per row it simply ignores the second set of 20H characters. Consequently the video pointer must be jumped by 20H characters each time it moves from one row to the next. This step checks for an end-of-row condition.

23. Last Character of Page? If ich is the last character of the page, the task is finished.

24. Add 20H to BC / Inx H, B. This adds the 20H to BC and then increments both registers to get to the next character.

25. Call New Page. This draws a pad from the apl, inserts appropriate housekeeping information, and prepares vid for receiving a new page.

The first main operation at the transmitter is the receiving of text information from the keyboard and the storing of that information in memory. This is accomplished by Steps 5 and 21-25 of the Executive. This section of the Executive Program is referred to as the "First Section".

The second main operation of the transmitter is the retrieval of encoded pages from transmitter memory and the delivering of these pages to the Driver. This is accomplished by the "Transmit" routine referred to in Step 19 of the Executive Program.

ldapl Routine (Load Available Page List)

Text Memory is that part of memory available for holding articles. It extends from pad 04 to and including pad C6. The pads of these pages are 04, 06, 08 . . . C2, C4, and C6. Initially, these pads are placed in an "available page list"—apl. Pads are drawn from apl as articles are entered into the Quinews. As articles are withdrawn from the Quinews, the pads of their respective pages are returned to apl. The list is stored in memory. To facilitate withdrawal and return of pads to the list, the address of the last pad on the list at any particular time is stored in a memory location designated maplptr (apl pointer).

The present routine stored in a third section of the transmitter program will place the pad of the first page in the first location of apl. It will put the pads of succeeding pages in succeeding locations of apl until the last pad has been loaded. Steps of the routine will be discussed in order.

1. Starting Address of apl to HL. HL will be used as a pointer for the apl list.

2. Pad of last text page to E. Pads will be loaded via a loop. Loop will operate until the pad the pad present in E is reached. Pad is the C6.

3. Pad of first text page to A. This pad will be the 04.

4. Pad in A to memory. This is the first step of the loop.

5. Pad for last page of text mem? This checks for the end condition.

6. Inx HL. Increments to next storage location in apl.

7. Double increment A. A is double incremented because a page is 200H characters rather than 100H.

8. Store HL to maplptr. This puts the address of the last available page into this storage location.

9. xora. This nulls the A register. The step is not needed. However, nulling the A register is more or less standard practice in this program.

clpg-(Clear Page)

When the operator calls for a new page, that page will generally contain material from an article which has been withdrawn from the Quinews. Similarly, vid will contain text from previous work. It is desirable to clear both pages. This routine accomplishes this. The four housekeeping pads are undisturbed. Steps will be discussed in order.

1. Call pads. At any particular time the text pointer (HL) will be pointing to the index character (ich) in text memory. The vid pointer (BC) will be pointing to the corresponding character in the vid page. The cursor will appear at this character in the display. It is often desirable to return both pointers and the cursor to the first text character of the page. Routine "pads" accomplishes this.

2. Blank to A. This blank in A will be fed to each location of both the text page and the video page. The code for a space is 20 in both Rowcode and ASCII.

4. Inx B, A to V. Recall that the video board used in the prototype was designed to provide either 20 characters per row or 40 characters per row. The Quinews operates in the 20 characters per row mode. The second 20 characters of each row of the 40 in vid are not used. By loading blanks into two succesive locations on each pass through the loop—this feature of the video board is accommodated.

6. HL=x(xxx0)00? This step asks if the task is finished. It is finished when HL contains the pad of the next page. For each pad, L=0 and H has a 0 in the LSB. Other bits of H may be anything. The cited test checks for the zeroes. If the test fails, then the task is not finished. Another pass through the loop is made.

7. Y/H=H-02, L=0.4 This returns the text pointer to the first text character of the page.

8. B=B-04 C=04 / This returns the vid pointer and cursor to the first text character of the video page.

9. xora / This returns A to zero.

pads—Text Pointer to Text Pad. Vid Pointer to Vid Pad. This command returns the cursor to the beginning of the text of the video page. It also returns the text pointer to the first text character of the page. Steps will be discussed in order.

1 04 to L / L to C / To skip the four pads at the beginning of each page, L and C are set to 04 rather than 00.

FE to A / ana H / A to H / The more significant byte of the text pointer should have a 0 in the LSB position. Remainder of byte should be unchanged. This step achieves this.

3 D8 to E / For the vid pointer the upper byte is always D8.

4 xora / This zeroes the A register.

kbd—Keyboard

This routine checks the keyboard to see if a character has been keyed. If so, this routine brings the character in. Suppose the order is a REPEAT. It then becomes necessary that the processor know what the previous order was. To accomodate this requirement, each order is stored in memory until after the next order is executed. It is desirable that a cursor blink over ich (index character) pointed to by BC. This routine implements this feature. Steps will be discussed in order.

1. Push D / Cursor character to E / stc / 00 to micha / Micha is a memory location at which each incoming character is stored. When the next character comes in, the content of Micha is shifted to Michb. Consequently michb always holds the previous command.

2. Data Ready? / The keyboard raises a flag when data is ready. This step asks if that flag is raised.

3. micha to michb / This shifts the previous character to michb. Consequently michb always contains the previous command.

4. kch to A. Keyed character to accumulator.

5. ich to D / Steps 5, 6, and 7 cause alternate display of the cursor and any character which may be at that location.

8. Call dly / Delay is about a half second.

9. cmc / This causes carry to alternate with each passage through Step 9.

10 Carry? / If Carry is set, then the keyboard is checked for input. If Carry is reset, the keyboard is not checked. This insures that the routine will always end with a character in the ich position rather than the cursor.

11. micha to michb. See step 3.

12. A to micha. First step in saving the command.

bc—Back by Character. This moves ich back one space—moves the HL pointer, the BC pointer, and the cursor. However, it will not move back into the previous page. Steps will be discussed in order.

1. Is ich first of row? / At a jump to a previous row we should subtract 20H from the BC register. This step asks if the jump will be to a previous row.

2. Is ich the first of page? / If it is, then no jump will be made.

3. Subtract 20H from BC. / Since ich is first of row but not first of page.

4. dcx H and B / This moves to the previous character.

fc—Forward by Character. This moves the cursor and pointers forward by one character. Steps will be discussed in order.

1. Is ich last of row? / If it is, then we will have to skip the 20 extra locations in vid.

2. Is ich last of page? / If it is, the operation is aborted.

3. Add 20H to BC. / This step is executed if ich is the last of a row but not the last of the page. Step accommodates the extra 20 characters in each video row.

4. In H and B / This effects the normal step to the next character.

br—Back by Row. The first time this command is given, the cursor moves to the beginning of the present row. Successive commands move it successively to the first characters of previous rows. Steps will be discussed in order.

1. First Row of Page? / The operation is aborted for the first row of the page.

2. Dcx H and B / If ich is the first character of a row, this moves us to the end of the next previous row.

3. Move to left of Current Row / If the previous character was not the first of a row, this moves the cursor and pointers to the beginning of the present row. If the previous character was the first of a row, then this command moves to the beginning of the previous row.

fr—Forward by Row. This command moves the cursor and pointers forward to the first character of the next row—unless the present row is the last of a page. In which case, no action is taken. Steps will be discussed in order.

1. Last Row of Page? / If the present row is the last of the page, no action will be taken.

2. Move to left of current row / A preparatory action.

3. Add 20H to HL. Add 40H to BC. / This puts pointers and cursor at the beginning of the next row.

bp—Back by Page. This command is used by the operator in reviewing the article. It puts the previous page into the display. If the first page of an article is in the display when this command is given, the page is put into the display a second time. Steps will be discussed in order.

1. Pull ppad from Present Page / This is the pad for the previous page. It is the second character of the four housekeeping characters at the beginning of the page.

2. Move ppad to H / PPad is the hi byte of the address of the previous page. This step moves it to the upper octet of the text pointer.

3. Move 00 to L / The low byte is always zero. Consequently L is zeroed.

4. Call tf (transfer) / This subroutine moves the page addressed by the text pointer to vid.

fp—Forward by Page. This puts the next page of the article into the display. Steps will be discussed in order.

1. Pull npad from present page / Npad is the third of the four housekeeping characters at left of first row.

2. Move npad to H / This puts it in the hi byte of the text pointer.

3. Move 00 to L / The L register is null for all pads.

4. Call tf (transfer) / This puts the "next page" into the display. If the present page was the last of the article, it will be returned to the display.

pdir—Parent Directory. This routine returns to the display the directory page from which the current article was selected. Steps will be discussed in order.

1. Pull pdir from present page. / This is the third character of the page.

2. Move pdir to H. / This moves it to the hi octen of the text pointer.

3. Move 00 to L. / The lo byte of all pads is a null. This zeroes the lo byte of the text pointer.

4. Call tf / This transfers the text page pointed to by the text pointer to the video page.

pmdir—Prime Directory. Operation of the Quinews begins with the Prime Directory. This command places it into the display. Steps will be discussed in order.

1. 0200H to HL. The Prime Directory is always at 0200. Consequently, to place it in the display it is necessary only that this page be moved to the display.

2. Call tf / This subroutine moves the page pointed to by HL to the display.

nart—New Article. The editor specifies in which directory the headline for a new article is to be listed. The operator adds the headline to this directory. He then calls nart. This routine draws a pad from the apl, places that pad in the headline row of the directory, puts the pad in the text pointer, and then loads the pad into the first of the housekeeping characters of the text page. The routine performs other chores to prepare the system for entry of the new article. Steps will be discussed in order.

1. Save Directory rad of Article / After a pad has been drawn from the apl, that pad must be inserted into the hpad position of the headline row in this directory page. This necessitates that the directory row address be remembered.

2. Is apl Empty? / If it is, then some articles will have to be deleted to provide the necessary pages.

3. Call Delete / This is a subroutine for deleting articles and returning their pads to apl.

4. Fetch npad (new pad) from apl, move to HL / The pad should now be available.

5. HL to hpad of Directory Row / That takes care of the Directory.

6. Call clpg / This removes the old text and clears the display.

7. HL to pad, ppad, and napd / Since this is the first page of the article, there is no previous page. In which case the pad of the present page is placed in the ppad position. At this ime there is no next page either. Consequently pad is placed in the npad position also. When a second page is added to the article, this npad will be replaced by the pad of that next page.

9. pad+4 to HL / vad+4 to BC / This sets the pointers for the first text character of the new page.

clrow—Clear Row. Sometimes enough mistakes will be made in a row that it is better to wipe it out and start over. This command permits that to bedone. The housekeeping characters of the first row ought not be cleared. Consequently provision is made for preventing this. Steps will be discussed in order.

1. Obtain trad (text row address) / Put in Hl / This is the address of the first character of the row.

2. First Row of Page? / If it is, then care must be exercised to save the housekeeping characters.

3. vrad to BC / This puts the vid pointer at the first character of the row.

4. trad+4 to HL / vrad+4 to BC / This skips the housekeeping characters.

5. Push H, B / At the end of the routine the pointers will be returned to the first text character of the row. That will be done by merely popping the stack.

6. Blank to A / For both ASCII and Rowcode, the character representing a blank is a 20H.

9. HL=xx(xx0)0? / When the job is finished HL will hold this number.

10 Pop B / Pop H / This returns the pointers to the first text locations of their respective rows.

11 xora / This places a null in the A register.

tf—Transfer. This subroutine is used in the bp and fp routines. The pad of a text page is placed in HL. The subroutine transfers the respective page to the display. Steps will be discussed in order.

1. Call pads / The pad of the desired text page is placed in HL. The vpad is placed in BC.

2. mem to vid / The character pointed to by HL is transferred to the video location pointed to by BC.

3. eor—End of Row? / If this is the end of the row then BC should be incremented by 20H.

4. eop—End of page? / If this is the end of page, job is done.

5. Add 20H to BC / This must be done at the end of each row.

6. Inx H and B / This moves the two pointers to the next character.

7. Call pads / This returns the pointers to the beginning of the page.

dly—Delay. This subroutine sets up a loop which is traversed a specified number of times in order to obtain the desired delay. It is used to provide a proper "ON" time for the blink of the cursor. Steps will be discussed in order.

2. Lxi D FFFF / A countdown number is loaded into DE. The maximum such number is FFFF. Lesser numbers may be entered. They will generate lesser delays.

3. The xthl command exchanges HL with the top of the stack. Doing it twice leaves the machine in its original condition. The xthl operation is good for delay loops because it requires a rather considerable time for execution.

npg—New Page. When one page becomes full, this routine is automatically called to provide a new page. This routine may also be called by the operator at any time. It draws a pad from the apl, clears the text page and the video page, inserts the housekeeping characters, and places the pointers at the start of text. Steps will be discussed in order.

1. pad to mpad / The pad of the old page will become the ppad of the new. It is necessary to place the old in temporary storage.

2. aplptr to HL / This pointer is stored in maplptr. It is fetched preparatory to obtaining the new pad.

3. apl empty? / This checks for this possibility. If out of pads, a subroutine DELETE is called. This subroutine permits the operator to select articles to be deleted. Their pads are then returned to apl—making more pages available.

4. Call Delete / This will free up the pages.

5. aplptr to HL / At this point it is assured that a pad will be available.

6. New pad from apl to H / 00 to L / This gets our new pad.

7. dcx aplptr / Return to maplptr / This stores the proper pointer to be used in drawing the next pad from apl.

Steps 2, 3, 4, 5, 6, and 7 deal with apl and consequently are part of the third section of the transmitter program.

8. Call clpg / This clears both the text page and the video page.

9. mpad to ppad / mpad was a storage location in memory. The pad of the previous page was stored in it in Step 1 above.

10. H to pad, npad, and npad of old page. Placing the pad in npad of the present page is temporary. If another page is added, the pad of that page will replace the pad presently placed in npad.

11. pdir old to pdir / Parent Directory remains the same from page to page.

12. tpad+4 to HL, vpad+4 to BC / This sets up the pointers for receiving new text.

rpt—Repeat. If the operator wishes to move backward by 10 characters he would find it a bit tedious to hit the bc character a total of 10 times. The Repeat routine eliminates the need for such repetitive keying for the back and forward commands. The desired command is keyed. It is followed by the Repeat command. The system will repeat the previous command until any key of the keyboard is struck. The steps will be discussed in order.

1. Call dly (delay) / A small pause at the beginning of the operation to permit the operator to recover from giving the command.

2. michb to A / The kbd (keyboard) routine contains a part which causes memory location michb to always hold the character keyed previous to the present. In this case, michb will hold the previous command.

3. Back-by-char? If the previous command was a bc command, then Step 4 executes it again. If not, the bc operation is skipped.

5 to 14. The same procedure is followed for the fc, br, fr, bp, and fp commands. If the character in michb was none of these commands, the operation is aborted at Step 13.

15. Call dly / About half a second.

16. Any key down? / If a key is down, the operation is terminated. If none is down, then another pass through the loop is made.

dlt—Delete. This routine is used to delete an article from the Quinews. It constitutes a fourth section of the Program. The operator reviews the directories. When he finds an article which is of little interest or has been in the text for a long time he deletes it. Upon keying dlt a prompter word of DELETE appears at the bottom right of the display. He then keys the row number of the article he wishes to delete. The pads of the pages of the article are returned to apl. The entry row is removed from the directory. Subsequent rows move up by one. If this leaves an empty last directory page, the pad of that page is added to the apl. The original directory page with the selected row deleted is then return to the display. Steps will be discussed in order.

1. Directory Page? / The Delete command requires that a directory page be in the display.

2. Save pad in dpad / This will permit the pad to be returned to the display at a later time.

5. An abort command? (FF) / Yes / Ret / This permits the operator to change his mind.

6. Number? / If the keyed character is not a number between 1 and F, a new number is requested.

8. Move remaining rows of directory up one / This eliminates the selected row. Rows in subsequent pages are moved up by one also.

9. At least one entry on last page of directory? / It is possible that there could have been only one entry on the last page. If so, then the page is now blank. It may be eliminated.

10 and 11. These steps eliminate that last directory page.

12. apad to HL / The pad for the article was stored in apad in Step 7.

13 to 15. / This loop returns successive pads of the article to apl.

16. dpad to HL / The pad of the directory was stored in dpad in Step 2.

17. Call tf / This moves the directory page less selected row to the display.

Steps 10-13 deal with apl and are consequently part of the third section of the transmitter program.

tma—Transmit Article. After the operator has entered an article into transmitter text memory and checked it for correctness, he calls this routine to have it transmitted to the receivers. At the time the call is made, a text page of the article should be in the display and the cursor should be somewhere in the page. Steps will be discussed in order.

1. Call apad (article pad) / An address somewhere in the article must first be in HL. / The subroutine obtains the pad for the first page of the article and places it in HL.

2. Call tmp (transmit page( / This transmits the page. First step of a loop which transmits all the pages of the article.

3. Last page of article? / A check to see if job is finished.

4. No / Npad to HL / Getting ready to transmit the next page.

5. dpad (Directory pad) to HL / When an article is added, its headline row is added at the end of its respective directory. Consequently this directory page should be transmitted once the article itself has been transmitted.

6. Call tmp (transmit page) / This transmits the page.

apad—Article Pad to HL

Given any address within the article, this subroutine places the pad for the first page of the article into HL. Steps will be discussed in order.

1. Pad of present page to A. Present page must be page of article.

2. pad=ppad? / If it does, then the page is the first of the article.

3. ppad to A / The present page was not the first page. This step moves back one page. Repeat the check for this new page.

4. pad to H, null to L / The first page has been reached. Its pad is put into H and a null into L. This puts the full pad into HL.

tmp (Transmit Page). This subroutine transmits the article whose pad is in HL. Steps will be discussed in order.

1. 08 to B, F0 to A / Register B will be used as a countdown register for the eight dummy characters. The dummy character is loaded into register A.

2. Transmitter Ready? / In the prototype a MITS casette recorder transmitter feeding to an RCA wireless intercom transmitter was used. The casette board issued a "ready" signal when it was ready to receive the next character. This step looked for this flag.

3. A to xmtr / dcr B / B=0? / The loop of this and the previous step puts the eight dummy characters out.

4. AA to A / The character AA to the accumulator. This is the Start signal. It tells the receivers that the next character will be the pad for the next page to be transmitted.

4. xmtr ready? / Looking for that ready signal again.

6. A to xmtr / Completes transmission of the Start signal.

7. xmtr ready? / Start of the loop which will transmit the text of the page.

11. End of Page? / Job is finished when last 9 bits of HL are zeroes.

COMMENTS

1. The Transmission Signal. In the prototype, the transmitter used FSK modulation to place the coded pages onto an audio signal. This audio signal was modulated onto a 175 KHz rf carrier. The rf carrier was put onto the 60 Hz AC line. Other types of modulation may be used. The pulses themselves may be sent over a telephone line, or over a direct wire. The signal may be placed on a cable TV channel, on an FM subcarrier, or transmitted from a satellite. Direct wire permits the signal to be delivered directly to the receiver processor—eliminating the Receptor. Parallel transmission may be used.

2. Modernization of Hardware. In the prototype, an Altair microcomputer was used—a large cabinet and a half dozen special boards. A more modern system will use CMOS memory—less bulk and less power. Everything can be on a single board some 300 mm square.

3. Receiver Control Box. It may be a conventional keyboard having 20 keys plus an encoder instead of the combinational keyboard shown. Voice signals may also be used—or even the front panel switches of a microcomputer.

4. The Receiver Programmer. In the prototype the programmer was an Eprom. It may be replaced by a ROM, EEROM, or just plain ram. The last would require that a program be drawn from disc or other storage device whenever the system is turned on.

5. Housekeeping Character Positions. In the prototype, the ppad, npad, and pdir have been positioned immediately following the pad. However, they could well be at the end of the page. Moving the pad complicates the software somewhat.

6. Additional Commands. The number of commands may be increased. Additional commands may be:
Jump back to the first page of the present article.
Scroll, showing each page for a second.
Display the Prime Directory once every 10 seconds.
 For one second.
Then return to the page which was being shown.

7. Permanent Storage. The system may be fitted with a tape recorder (or disc) so that selected stories may be retained for future reference.

8. Alternate Displays. A CRT monitor has been used in the prototype. In an alternate system an RF modulator would permit a conventional TV set to be used as a display. Plasma, electroluminescent, and liquid crystal displays may also be used. The last is preferred.

9. Reduced News Coverage. A first person may read only the sports pages. A second person may be interested in only blue collar crime and wrestling. A third person may be interested in only white collar crime and politics. The amount of memory may be reduced if each of the various news fields is allocated a respective address field. Each person may then purchase only that memory required for the fields in which he is interested. In general, this makes for less effective use of memory. Only in special cases does use of this technique appear beneficial.

10. Still Pictures. Since each picture is transmitted only once, it becomes feasible to transmit very high definition pictures. Definition of 2000 horizontal lines and comparable vertical definition become practical. Eight gray levels may be provided. Color pictures are practical—but drive up the cost of the receiver display.

11. Alternate Programs. Many alternate programming techniques may be used to achieve the results achieved by the programs herein discussed. The present invention does not reside in these programming techniques but in the concept of placing mass storage at the receiver and storing the entire news of the moment in that memory. This was a radically new concept at the time of its inception, reduction to practice, and filing for patent. It was then entirely impractical because of the high cost and bulk of memory. Advances in solid state physics have brought both cost and size down by orders of magnitude since that day. The technique covered by this invention is entirely practical today.

12. Alternate Inputs at Transmitter. The simple keyboard considered at the transmitter was excellent for a reduction to practice. In a more useful system several alternate devices would be provided. Chief of which would be a modem for permitting the direct transfer of encoded news to transmitter memory from a remotely located source. This would permit newswire articles to be directly inserted into the Quinews.

TABLE 1

Rowcode to ASCII Converter.

| Conventional | Rowcode | ASCII | Conventional | Rowcode | ASCII | Conventional | Rowcode | ASCII |
|---|---|---|---|---|---|---|---|---|
| 0 | 00 | 30 |  | 36 36 |  |  | 6A |  |
| 1 | 01 | 31 | ] | 37 | 5D |  | 6B |  |
| 2 | 02 | 32 | @ | 38 | 40 |  | 6C |  |
| 3 | 03 | 33 |  | 39 |  |  | 6D |  |
| 4 | 04 | 34 |  | 3A |  |  | 6E |  |
| 5 | 05 | 35 | Undscr | 3B | 5F |  | 6F |  |
| 6 | 06 | 36 | < | 3C | 3C |  | 70 |  |
| 7 | 07 | 37 | ~ | 3D | 7E |  | 71 |  |
| 8 | 08 | 38 | [ | 3E | 5B |  | 72 |  |
| 9 | 09 | 39 | > | 3F | 3E |  | 73 |  |
| 10 | 0A | 41 | a | 40 | 61 |  | 74 |  |
| 11 | 0B | 42 | b | 41 | 62 |  | 75 |  |
| 12 | 0C | 43 | c | 42 | 63 |  | 76 |  |
| 13 | 0D | 44 | d | 43 | 64 |  | 77 |  |
| 14 | 0E | 45 | e | 44 | 65 |  | 78 |  |
| 15 | 0F | 46 | f | 45 | 66 |  | 79 |  |
| 0 | 10 | 30 | g | 46 | 67 |  | 7A |  |
| Minus | 12 | 2D | h | 47 | 68 |  | 7B |  |
| Mult | 13 | 2A | i | 48 | 69 |  | 7C |  |
| D.Pnt | 14 | 2E | j | 49 | 6A |  | 7D |  |

TABLE 1-continued

Rowcode to ASCII Converter.

| Conventional | Row-code | ASCII | Conventional | Row-code | ASCII | Conventional | Row-code | ASCII |
|---|---|---|---|---|---|---|---|---|
| ) | 15 | 29 | k | 4A | 6B | | 7E | |
| * | 16 | 2A | l | 4B | 6C | | 7F | |
| ] | 17 | 5D | m | 4C | 6D | A | 80 | 41 |
| + | 18 | 2B | n | 4D | 6E | B | 81 | 42 |
| = | 19 | 3D | o | 4E | 6F | C | 82 | 43 |
| / | 1A | 2F | p | 4F | 70 | D | 83 | 44 |
| # | 1B | 23 | q | 50 | 71 | E | 84 | 45 |
| ( | 1C | 28 | r | 51 | 72 | F | 85 | 46 |
| $ | 1D | 24 | s | 52 | 73 | G | 86 | 47 |
| Space | 1E | 20 | t | 53 | 74 | H | 87 | 48 |
| % | 1F | 25 | u | 54 | 75 | I | 88 | 49 |
| Space | 20 | 20 | v | 55 | 76 | J | 89 | 4A |
| \ | 21 | 5C | w | 56 | 77 | K | 8A | 4B |
| Period | 22 | 2E | x | 57 | 78 | L | 8B | 4C |
| " | 23 | 22 | y | 58 | 79 | M | 8C | 4D |
| , | 24 | 2C | z | 59 | 7A | N | 8D | 4E |
| ? | 25 | 3F | | 5A | | O | 8E | 4F |
| & | 26 | 26 | | 5B | | P | 8F | 50 |
| } | 27 | 7D | | 5C | | Q | 90 | 51 |
| Hyphen | 28 | 2D | | 5D | | R | 91 | 52 |
| . | 29 | 5E | | 5E | | S | 92 | 53 |
| " | 2A | 22 | | 5F | | T | 93 | 54 |
| : | 2B | 3A | | 60 | | U | 94 | 55 |
| ; | 2C | 3B | | 61 | | V | 95 | 56 |
| ' | 2D | 27 | | 62 | | W | 96 | 57 |
| { | 2E | 7B | | 63 | | X | 97 | 58 |
| | 30 | | | 64 | | Y | 98 | 59 |
| | 31 | | | 65 | | Z | 99 | 5A |
| | 32 | | | 66 | | | 9A | |
| | 33 | | | 67 | | | 9B | |
| | 34 | | | 68 | | | 9C | |
| | 35 | | | 69 | | | 9D | |

I claim:

1. A system for distributing news, said system including a transmitter and a set of receivers;

said transmitter constituting means for transmitting a signal on which encoded pages of news are modulated;

each of said encoded-pages comprising a sequence of encoded-rows, each of said encoded rows comprising a sequence of encoded-characters, and each of said encoded pages bearing a respective set of encoded characters constituting a page-address, said page address specifying where in receiver memory said encoded page is to be stored;

each of said receivers including a signal-receptor, a receiver-processor, a receiver-memory, a receiver-programmer modified in accordance with a receiver-program, a user-input-device, and a receiver-display;

said signal receptor constituting means for receiving said modulated-signal, extracting said encoded-pages therefrom, and delivering said encoded-pages to said receiver-processor;

said receiver-program including a receiver-routine for causing said receiver-processor to obtain from each of said encoded-pages the respective page-address of said encoded page and store said encoded-page at that location in said receiver-memory specified by said respective page-address;

said user-input-device constituting means for transmitting commands from a user to said receiver-processor, a set of said commands being page-select commands, each of said page-select commands specifying a selected encoded-page in said receiver-memory;

said receiver-program including a video routine for causing said receiver-processor in response to each of said page-select commands to move said selected encoded page from said receiver-memory to said receiver-display; and said receiver-display constituting means for displaying in readable form a display-page containing the information of said selected encoded page.

2. A system as in claim 1;

a first set of said encoded-pages being directory pages;

said directory-pages being divided into subsets, each of said subsets constituting a directory;

a set of rows of each of said directories being article-select-rows and each of said article-select-rows bearing a headline for a respective article;

each of said article-select-rows being successively numbered;

each of said article-select-rows bearing the page-address of the first page of said respective article, said page address being the address of the first character of said encoded-page;

an article-select section of said receiver-program constituting means for causing said receiver processor to perform an action in response to a respective command from said user via said user-input-device, said command specifying a selected article-select-row number, said action being the use of said article-select-row-number for obtaining from the respective article-select-row the respective page-address and delivering the encoded-page specified by said page address to said receiver-display.

3. A system as in claim 2;

a second set of said encoded-pages being text pages;

said text pages being divided into subsets, each of said subsets constituting an article;

each of said articles having a first encoded page, the first encoded-row of which encoded-page includes a headline for said article; and additional rows of said page being text-rows and containing the text of said article.

4. A system as in claim 2;

one of said directories being a "prime-directory";

the first encoded-page of said prime-directory occupying a fixed location in said receiver-memory;

said prime-directory listing feature headlines and titles of subordinate directories; and a prime-directory section of said receiver-program constituting means for causing said receiver-processor to perform an action in response to a user command calling for said prime directory to be displayed, said action being the retrieval of said first encoded-page of said prime-directory from said recover-memory and the delivery of said first encoded-page to said receiver-display.

5. A system as in claim 4;

each of said directories and each of said articles constituting an entry;

the first character of the first encoded-row of each of said encoded-pages other than the first encoded-page of said prime-directory, being the first character of the page-address of said encoded-page;

for all encoded-pages other than the first encoded page of each of said entries, the first character subsequent to the page-address characters of said page being the first character of the page-address for the immediately preceding page of said entry, the page-address of said preceding page being designated a previous-page-address;

for all encoded-pages other than the last encoded-page of each of said entries, the first character subsequent to the previous-page-address characters of said encoded-page being the first character of the page-address of the immediately following page of said entry, the page-address of the immediately following page being designated a next-page address; and the first character subsequent to said next-page-address for all encoded-pages other than those of said prime-directory being the first character of a page-address designated a parent-directory-address, said parent-directory-address being the page-address of that encoded-page of that directory from which the entry of a selected encoded-page was selected.

* * * * *